United States Patent [19]

Gowanlock

[11] 4,340,325

[45] Jul. 20, 1982

[54] CUTTING INSERT FOR DEEP GROOVING

[75] Inventor: Thomas W. Gowanlock, Rochester, Mich.

[73] Assignee: General Electric Co., Detroit, Mich.

[21] Appl. No.: 220,244

[22] Filed: Dec. 23, 1980

[51] Int. Cl.³ ............................................. B26D 1/00
[52] U.S. Cl. ................................... 407/116; 407/117
[58] Field of Search ............... 407/113, 114, 115, 116, 407/117

[56] References Cited

U.S. PATENT DOCUMENTS

| | | | |
|---|---|---|---|
| 2,779,992 | 2/1957 | Hayes | 407/116 |
| 2,831,240 | 4/1958 | Maurer | 407/114 |
| 2,855,657 | 10/1958 | Erhardt | 407/115 |
| 3,137,917 | 6/1964 | Dowd | 407/113 |
| 3,364,544 | 1/1968 | Urbanic | 407/117 X |
| 3,395,434 | 8/1968 | Wirfelt | 407/114 |
| 3,407,467 | 10/1968 | Wirfelt | 407/114 |
| 3,487,515 | 1/1970 | Contrucci | 407/114 |
| 3,564,684 | 2/1971 | Wietrzykowski | 407/117 |
| 3,654,681 | 4/1972 | Stein | 407/115 |
| 3,707,747 | 1/1973 | Falk | 407/114 |
| 3,815,191 | 6/1974 | Holma | 407/114 |
| 3,947,937 | 4/1976 | Hertel | 407/114 |
| 4,189,265 | 2/1980 | Arnold et al. | 407/114 |

Primary Examiner—Leonidas Vlachos
Assistant Examiner—Jerry Kearns
Attorney, Agent, or Firm—Hedman, Casella, Gibson & Costigan

[57] ABSTRACT

A cutting insert for use in a deep grooving tool is formed from an elongated generally rectangular block of cutting material having a cutting end. The insert includes a straight cutting edge, disposed perpendicular to the longitudinal axis of the insert and is defined by the juncture between one side edge of the cutting end and the leading surface of the insert. The leading surface of the insert, which is configured for controlling chips, includes a V-shaped ridge, spaced from the cutting edge and oriented such that the apex portion thereof is disposed closest to the cutting edge. The leading surface of the insert further includes a groove, which is contiguous with the V-shaped ridge, and extends towards the cutting edge. In one preferred embodiment of the subject invention, the groove is substantially planar in configuration and extends to and is contiguous with the cutting edge. In a second embodiment of the subject invention, a planar land area is provided between the cutting edge and the groove for effectively spacing the groove from the cutting edge. In the latter embodiment, the groove is defined by two arcuate segments which are disposed in mirror image relationship about a central rib. In use, the insert functions to reduce the width and length of said chips thereby increasing the efficiency of the grooving tool.

7 Claims, 7 Drawing Figures

CUTTING INSERT FOR DEEP GROOVING

BACKGROUND OF THE INVENTION

This invention relates to a new and improved cutting insert, used in deep grooving operations, having a unique chip controlling configuration. The leading surface of the insert includes a V-shaped ridge spaced from the cutting edge thereof. The V-shaped ridge is oriented such that the apex portion thereof is disposed closest to the cutting edge. A groove is also provided on the leading surface of the insert which is contiguous with the V-shaped ridge and extends towards the cutting edge. In one embodiment of the subject invention, the groove is also contiguous with the cutting edge and defines a flattened chip breaking area. In another embodiment of the subject invention, a planar land area is provided which is disposed between the cutting edge and the groove and is contiguous with both. The chip breaking configuration functions to reduce chip width and lengths.

In the prior art, replaceable cutting inserts have been developed for use with varying types of cutting tools such as milling, boring or grooving devices. The cutting insert, which is usually formed from a block of cemented carbide material, includes at least one sharpened cutting edge. The main advantage in using replaceable inserts is that when the cutting edge becomes worn, a fresh insert may be rapidly exchanged with the worn inset, thereby avoiding the down time associated with resharpening a tool having a fixed blade.

With the development of the cemented carbide materials, cutting speeds have increased dramatically. While the increased feed rates and cutting depths are effective in reducing manufacturing costs, certain problems associated with higher cutting speeds have occurred. More specifically, at low speed, the metal which was shaved away during a cutting operation would slowly fall away from the workpiece and present no difficulties. However, with increased feed rates and cutting depths, metal, removed from the workpiece, is in the form of a thin strip of material. This thin shaving of metal is rapidly produced and if not properly controlled, will damage the workpiece and poses a safety hazard to the operator. For example, in a grooving operation, a coil of metal is produced which often runs out of the groove and along the outer diameter of the workpiece, abrading its finish. Frequently, the snaking coil of metal breaks off in a large chip, flying away at a fast speed, posing serious safety problems for the operator of the machine. Another shortcoming associated with the prior art inserts in grooving operations is that metal chips, which had a width equal to the width of the groove, are caught or become bound in the machined grooves, thereby causing an increase in vibrations and cutting edge breakage. In response to these shortcomings, a number of inserts have been developed which include a chip breaking groove, formed on the leading surface of the insert, which function to break the coils into smaller, manageable chips. Examples of inserts having a chip controlling groove can be found in U.S. Pat. No. 3,395,434 issued Aug. 6, 1968, to Wirfelt, and U.S. Pat. No. 3,407,467 issued Oct. 29, 1968 also to Wirfelt. In these patents, cutting inserts are disclosed having chip breaking grooves disposed around the periphery of the insert, on the leading surface thereof, for breaking a snaking coil of metal into small chips. Other examples of cutting tools having chip breaking configurations can be found in U.S. Pat. No. 2,779,992, issued Feb. 5, 1957 to Hayes; U.S. Pat. No. 2,831,240, issued Apr. 22, 1958 to Maurer; U.S. Pat. No. 2,855,657 issued Oct. 14, 1958 to Erhardt; U.S. Pat. No. 3,487,515, issued Jan. 6, 1970 to Contrucci; U.S. Pat. No. 3,707,747, issued Jan. 2, 1973 to Falk; U.S. Pat. No. 3,815,191, issued Jan. 11, 1974 to Holma; U.S. Pat. No. 3,947,937, issued Apr. 6, 1976 to Hertel; and U.S. Design Pat. No. 28,425, issued Mar. 29, 1898 to Moon.

As noted above, one of the shortcomings associated with a deep grooving operation in particular, was that the removed metal coil tended to get caught and bound in the groove. The above cited patents, which contain chip controlling grooves for breaking a snaking coil into small pieces, failed to prevent the binding of the coil with a machined groove.

Accordingly, it is an object of the subject invention to provide a new and improved insert for use in conjunction with a deep grooving tool which functions to break metal coils removed during the grooving operation into small chips.

It is another object of the subject invention to provide a new and improved cutting insert for use with a deep grooving tool which simultaneously functions to reduce the width of chips to prevent their binding in the groove, thereby eliminating chip crowding and reducing vibrations and cutting edge breakage.

It is a further object of the subject invention to provide a new and improved cutting insert having a chip controlling configuration which functions to break removed metal into small chips, thereby preventing damage to the workpiece and facilitating easy disposal thereof.

It is still another object of the subject invention to provide a new and improved cutting insert for use with a deep grooving tool having a chip controlling configuration formed on the leading surface thereof, which includes a V-shaped ridge spaced from the cutting edge, and a groove contiguous with said ridge and extending towards said cutting edge for breaking the chips into small pieces and producing chips having reduced widths.

BRIEF DESCRIPTION OF THE INVENTION

In accordance with these and many other objects, the subject invention provides for a cutting insert, useful in deep grooving operations, formed from an elongated generally rectangular block of cutting material having a cutting end. The block includes a straight cutting edge which is disposed perpendicular to the longitudinal axis of the block and is defined by the juncture between one side edge of the cutting end and the leading surface of the insert. In accordance with the subject invention, the leading surface is provided with a chip controlling configuration which includes a V-shaped ridge which is spaced from the cutting edge, with the apex portion of the V-shaped ridge being disposed closest to the cutting edge. The leading surface further includes a groove which is contiguous with the V-shaped ridge and extends towards the cutting edge.

In one preferred embodiment of the subject insert the groove is generally planar and is contiguous with the cutting edge of the insert. In a second embodiment of the subject invention, intended for grooving at higher speeds, a planar land area is provided between the cutting edge of the insert and the groove. In the latter embodiment, the groove is defined by a pair of arcuately shaped segments which are disposed in mirror image relationship about a central rib which extends perpendicular to the cutting edge. The chip controlling configuration of the insert is operative to reduce the width of chips and to break them into short lengths during a grooving operation. By this arrangement, the workpiece is protected from abrasion, the small chips are readily disposable, and the safety hazard to the operator is significantly reduced. In addition, since the width of the chip produced is narrower than the width of the groove, the tendency of the chip to be trapped within the groove is substantially reduced.

Further objects and advantages will become apparent from the following detailed description when taken in conjunction with the drawings in which:

DESCRIPTION OF THE PREFERRED EMBODIMENTS

Figure 1:
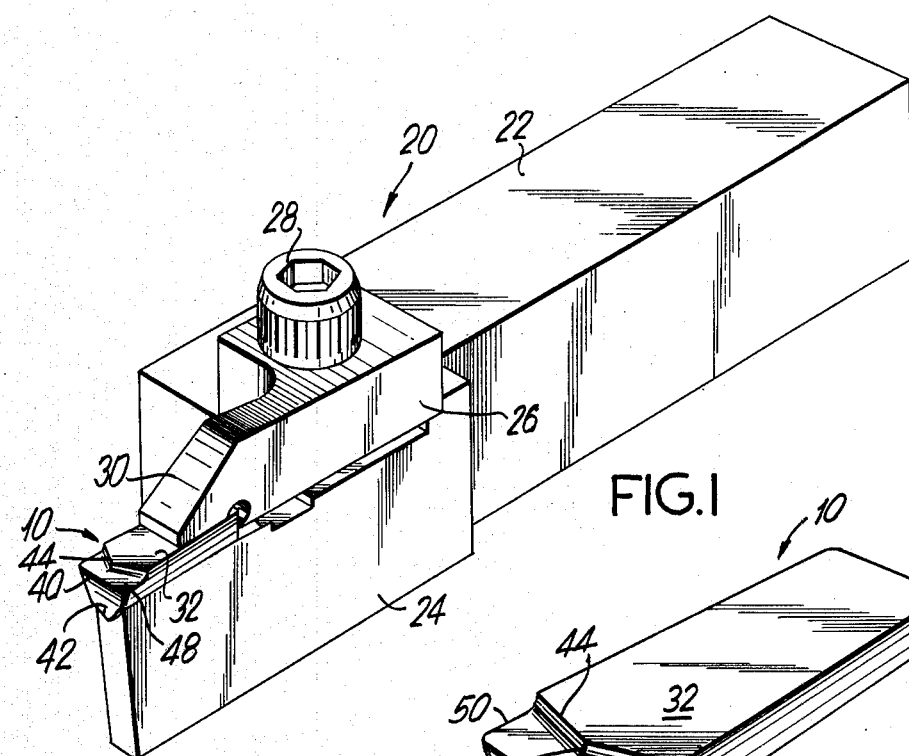
FIG. 1 is a perspective view of a standard deep grooving tool having the new and improved cutting insert of the subject invention mounted thereon.

Referring to FIG. 1, there is illustrated a first embodiment of the cutting insert 10 of the subject invention as used in conjunction with a deep grooving tool 20. The deep grooving tool, which is intended to machine a circular groove into the O.D. of a cylindrical workpiece, and not into the end face of a cylinder, includes a longitudinally extending rectangular body 20 and a generally planar support blade 24 projecting axially outwardly from the forward cutting end of the body 20. A clamping means 26 is provided for releasbly securing the insert 10 to the support blade. Clamp 26, which is releasably secured to the body 22 via screw 28, includes a projecting arm 30 which bears on the upper leading surface 32 of the insert. As used herein, the leading surface of the insert corresponds to the surface of the insert which leads or precedes the insert into the groove during a cutting operation. The lower or trailing surface 34, is opposed to the leading surface 32.

Figure 2:
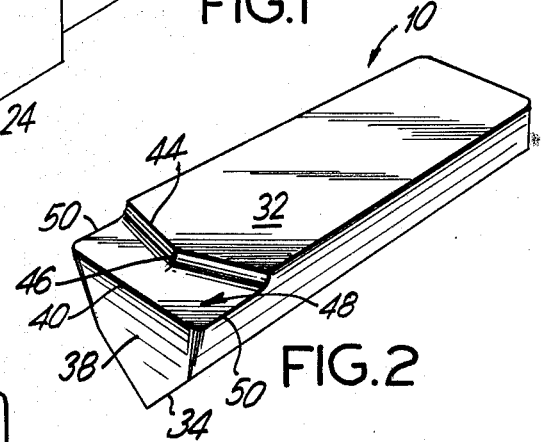
FIG. 2 is a perspective view of a first embodiment of the new and improved cutting insert of the subject invention.
Figure 3:
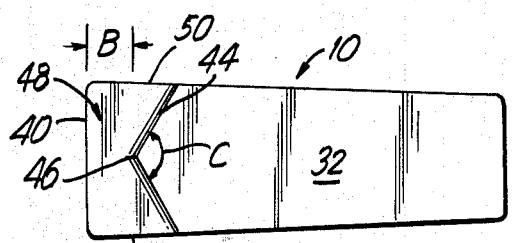
FIG. 3 is a top plan view of the first embodiment of the cutting insert of the subject invention.
Figure 4:
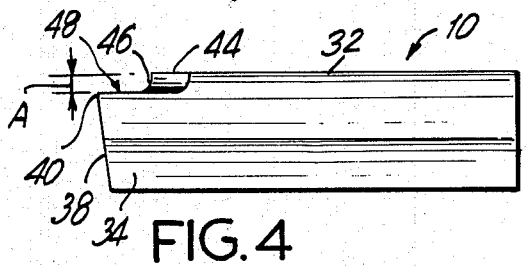
FIG. 4 is a side elevational view of the first embodiment of the cutting insert of the subject invention.

Referring to FIGS. 2-4, the first embodiment of the insert 10 of the subject invention is more particularly illustrated. Insert 10 is preferably formed from a longitudinally extending generally rectangular block of cutting material, such as sintered tungsten carbide, and includes a cutting end 38. The sharpened cutting edge 40 of the insert 10 is defined by the juncture between an edge of the cutting end 38 and the leading surface 32. As illustrated in FIG. 2 the trailing surface 34 may be provided with a V-shaped configuration corresponding to a V-shaped groove 42 formed on the upper surface of support blade 24. The complimentary V-shaped configurations 34, 42 aid in securely locking the insert to the blade 24 of the cutting tool 20.

As illustrated in FIG. 1, the insert 10 is clamped to tool 20 with the cutting end 38 thereof projecting axially beyond support 24. In operation, the workpiece is rotated relative to the tool 20 enabling the cutting edge 40 to remove a strip of metal from the workpiece. The strip of metal snakes outwardly along the leading surface 32 of the insert.

In accordance with the subject invention, the leading surface 32 of the insert is configured to control the size and width of the chips produced during a grooving operation. More specifically, the leading surface 32 includes a V-shaped ridge 44 which is spaced from the cutting edge of the insert 38. The V-shaped ridge 44 is oriented such that the apex portion 46 thereof is closest to the cutting edge 40 of the insert. Preferably, the apex 46 is disposed to coincide with an imaginary line which is perpendicular to and bisects cutting edge 40.

Leading surface 32 of insert 10 further includes a groove 48 which is formed contiguous with the V-shaped ridge 44 and extends towards cutting edge 40. In the first embodiment of the subject invention, and as illustrated in FIGS. 2 and 4, groove 48 is also contiguous with the cutting edge 40, as well as with a portion of each side edge 50 of the leading surface 32 adjacent the cutting end 38. Preferably, the surface of groove 48 is substantially planar and is spaced from the leading surface 22 a distance A, equal to 0.01 inches as illustrated in FIG. 4. As further illustrated in FIG. 4, the transistion 54 between the groove 48 and V-shaped ridge 44 is arcuate in configuration. Preferably, and as illustrated in the plan view of FIG. 3, apex 46 of V-shaped ridge 44 is spaced from the cutting edge 40 of the insert a distance B which is equivalent to approximately 0.04 inches. The included angle C between the sides of V-shaped ridge 44 is approximately 120°.

As stated above insert 10 is clamped to the deep grooving tool 20 such that the cutting edge 40 projects axially beyond the support blade 24. With the workpiece rotating relative to the tool, the cutting edge 40 is capable of machining a groove therein. As the metal is removed and passes over the leading surface 32 of the insert, the cooperation between the groove 48 and the V-shaped ridge 44, functions to break the coil into small chips and in addition functions to reduce the effective width of chip. More specifically, the V-shaped ridge 44 functions to bend the elongated strip about its longitudinal axis, thus reducing its effective width such that it is narrower than the groove being machined. By this arrangement, the likelihood of the chip being caught within the groove of the workpiece is substantially reduced. Further, since the coil is broken into small chips the dangers to the operator are reduced, and damage to the finish of the workpiece inhibited. In a test run, using an insert formed in accordance with the first embodiment of the subject invention, using AISI 4140 steel, a groove was machined at 400 SFPM with a feed rate of 0.030 inches per revolution. In this test, chips having an open C-type configuration were produced of approximately 2.75 inches in length.

Figure 6:
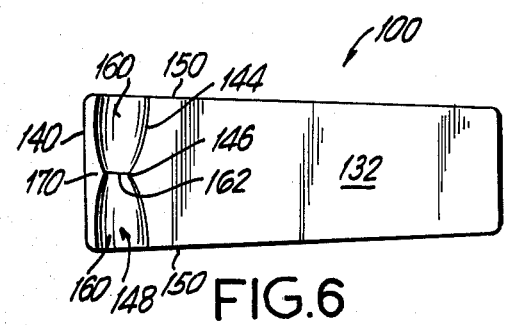
FIG. 6 is a top plan view of the second embodiment of the cutting insert of the subject invention.
Figure 7:
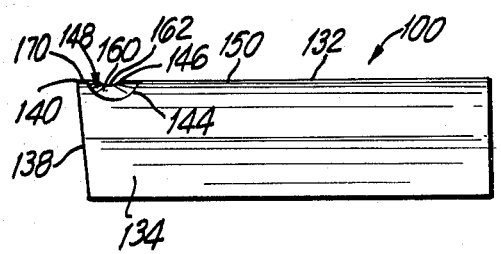
FIG. 7 is a side elevational view of the second embodiment of the cutting insert of the subject invention.
Figure 5:
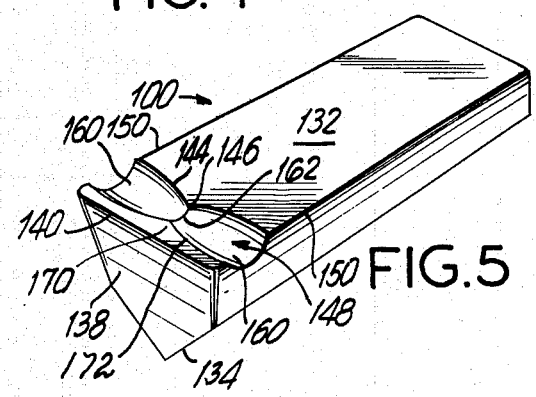
FIG. 5 is a perspective view of a second embodiment of the new and improved cutting insert of the subject invention.

Referring to FIGS. 5-7, a second embodiment of the insert 100 of the subject invention is illustrated and is intended to be utilized in relatively higher speed grooving operations. The insert 100 similar to insert 10, is preferably formed from a block of sintered carbide material and includes a forward cutting end 138. The cutting edge 140 is defined by the juncture between the forward cutting edge 138 and the upper leading surface 132. The lower trailing surface 134 of the insert may be provided with a V-shaped configuration to facilitate clamping of the insert within a support blade 24.

In accordance with the subject invention, leading surface 132 of the second embodiment of the insert 10 includes a V-shaped ridge 144 which is spaced from the cutting edge 140. Ridge 144 is oriented such that the apex 146 thereof is nearest to the cutting edge 140. The leading surface 136 further includes a groove 148 which is contiguous with the V-shaped ridge 146 and extends towards cutting edge 148. In the second embodiment of the insert 100 of the subject invention, groove 148 is defined by a pair of arcuate segments 160 which are disposed in essentially mirror image relationship about a central upstanding rib 162 extending perpendicularly to the cutting edge 140. The inner surfaces of the arcuate segments 160 are rounded and may be formed by a grinding wheel. The width of each of the arcuate segments 160 increases from the central rib 162 to the opposed ends thereof. Each segment 160 extends to the respectively associated side edges 150 of leading surface 132.

Insert 100 further includes a planar land area 170 which is disposed between groove 148 and cutting edge 140 and is contiguous with both. The planar land area 170 is disposed coplanar with the leading surface 132 of insert 100. As illustrated in FIG. 5, the transistion 172 between land area 170 and groove 148 is arcuate in configuration. The planar land area 170 functions to effectively space groove 148 away from cutting edge 140 of the insert. The latter configuration is found to be more effective in higher speed cutting operations where the chips tend to skip past the cutting edge 140. By spacing groove 148 away from cutting edge 140, metal coils which tend to skip past the cutting edge 140 are more readily controlled. As in the first embodiment of the subject invention, V-shaped ridge 144 cooperates with the groove 148 to produce chips of reduced length and width.

In summary, there is provided a new and improved cutting insert for use with a deep grooving tool. The insert is formed from an elongated generally rectangular block of cutting material having a cutting end. The block includes a straight cutting edge which is disposed perpendicular to the longitudinal axis of the block and is defined by the juncture between one side edge of the cutting end and the leading surface of the insert. In accordance with the subject invention, the leading surface of the insert is configured for controlling chips. More specifically, the leading surface includes a V-shaped ridge spaced from the cutting edge, which is oriented such that the apex portion thereof is disposed closest to the cutting edge. The leading surface further includes a groove which is contiguous with the V-shaped ridge and extends towards the cutting edge. In one embodiment of the subject invention, the groove extends to and is contiguous with the cutting edge and has a substantially bottom surface. In another embodiment of the subject invention a planar land area is provided between the cutting edge and the groove which effectively spaces the groove from the cutting edge. In the latter embodiment, the groove is defined by two arcuate segments which are disposed in mirror image relationship about a central rib. In use, the insert functions to reduce the width and length of chips thereby increasing the efficiency of the tool.

It is to be understood that while the subject invention has been described by reference to preferred embodiments, it is apparent that other modifications could be devised by those skilled in the art that would fall within the scope and spirit of the subject invention as defined by the appended claims.

I claim:

1. An improved cutting insert configured for controlling chips during a deep grooving operation, said insert being formed from an elongated, generally rectangular block of cutting material having a cutting end, said block including a straight cutting edge, disposed perpendicular to the longitudinal axis of said block and defined by the juncture between one side edge of said cutting end, and one longitudinally extending surface of said rectangular block, said one surface corresponding to the leading surface of said insert, said improvement comprising:
 a V-shaped ridge formed in said leading surface and spaced from said cutting edge, with an apex portion of said V-shaped ridge being disposed closest to said cutting edge;
 a groove formed in said leading surface contiguous with said V-shaped ridge and extending towards said cutting edge,
 a planar land area formed on said leading surface and disposed between and contiguous with said cutting edge and said groove,
 wherein said improvement is operative to reduce the length and width of chips during a grooving operation.

2. A cutting insert as recited in claim 1 wherein the apex of said V-shaped ridge coincides with an imaginary line which is perpendicular to and bisects said cutting edge.

3. A cutting insert as recited in claim 1 wherein the surface of said planar land is coplanar with said leading surface of said insert.

4. A cutting insert as recited in claim 1 wherein said groove is defined as a pair of arcuate segments which are disposed in mirror image relationship about a central rib extending perpendicular to said cutting edge.

5. A cutting insert as recited in claim 4 wherein the width of said arcuate segments increases from said central rib to the respective opposed ends thereof.

6. A cutting insert as recited in claim 4 wherein the transition between said groove and said planar land area is arcuate in configuration.

7. An improved cutting insert configured for controlling chips during a deep grooving operation, said insert being formed from an elongated generally rectangular block of cutting material having a cutting end, said block including a straight cutting edge disposed perpendicular to the longitudinal axis of said block and defined by the juncture between one side edge of said cutting end and one longitudinally extending surface of said rectangular block, said one surface corresponding to the leading surface of said insert, said improvement comprising:
 a V-shaped ridge formed in said leading surface and spaced from said cutting edge, with an apex portion of said V-shaped ridge being disposed closest to said cutting edge;
 a groove formed in said leading surface contiguous with said V-shaped ridge and extending towards said cutting edge, said groove being defined by a pair of arcuate segments which are disposed in mirror image relationship about a central rib extending perpendicular to said cutting edge; and
 a planar land area formed on said leading surface and disposed between and contiguous with said cutting edge and said groove, said improvement being operative to reduce the length and width of chips during a grooving operation.

* * * * *